Figure 1:
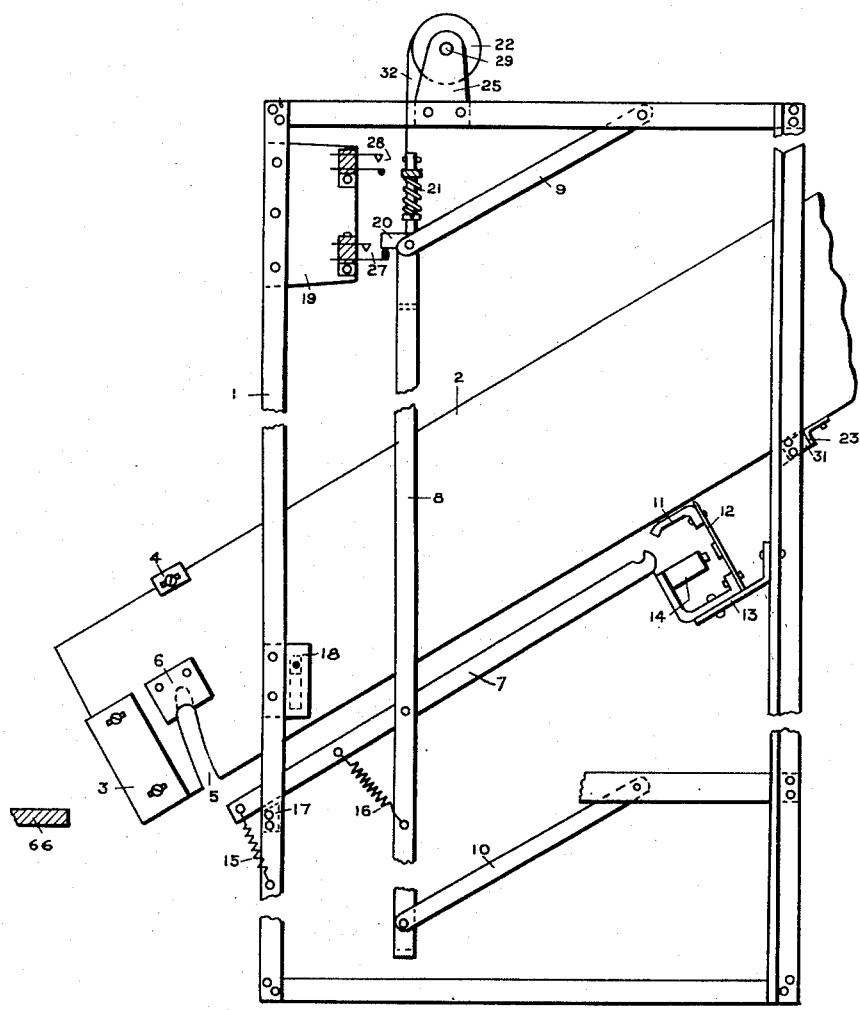

Jan. 4, 1955 T. S. SKILLMAN 2,698,699
ARTICLE DISPENSING SYSTEM
Filed Aug. 4, 1949 8 Sheets-Sheet 1

Inventor
Thomas S. Skillman
By Ward, Crosby + Neal
Attorneys

Jan. 4, 1955
T. S. SKILLMAN
2,698,699
ARTICLE DISPENSING SYSTEM
Filed Aug. 4, 1949
8 Sheets-Sheet 7
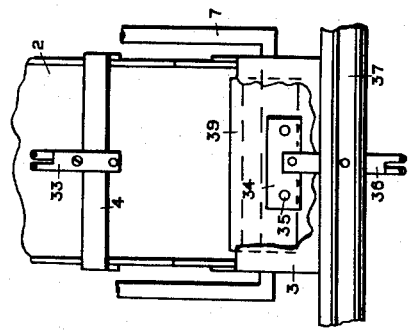
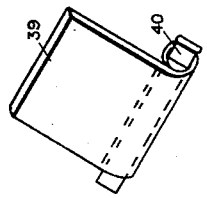
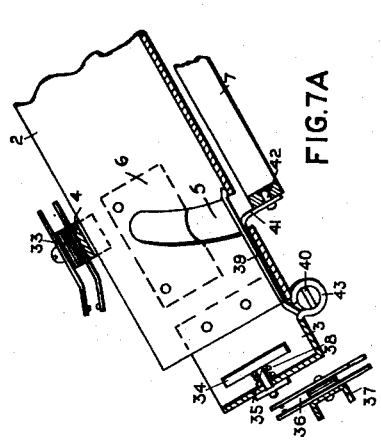
*Inventor*
*Thomas S. Skillman.*
By
*Attorneys.*

Jan. 4, 1955

T. S. SKILLMAN 2,698,699

ARTICLE DISPENSING SYSTEM

Filed Aug. 4, 1949

8 Sheets-Sheet 8

*Inventor*
*Thomas S. Skillman.*
By *Ward, Croley & Neal*
*Attorneys.*

United States Patent Office 2,698,699
Patented Jan. 4, 1955

2,698,699

ARTICLE DISPENSING SYSTEM

Thomas Samuel Skillman, Mosman, near Sydney, New South Wales, Australia, assignor to Punch Engineering Pty. Limited, Cammeray, near Sydney, New South Wales, Australia, a corporation of New South Wales, Australia Application August 4, 1949, Serial No. 108,441

Claims priority, application Australia August 6, 1948

7 Claims. (Cl. 221—6)

The invention relates to article dispensing systems and particularly to such systems in which articles of various character, for example, different kind or price, can be selectively dispensed.

Hitherto in systems of this kind each supporting means, carrying one kind of article only, is provided with a release mechanism which when selected is individually operated to release a wanted article. The selection of any of the release mechanisms is performed by a set of keys which for example operate selecting relays corresponding to a stock number or code of an article keyed up at the key set.

These arrangements, however, suffer from the defect that separate electrical circuits have to be provided for each individual storage means and that extensive relay or switch arrangements are necessary to transmit the selection of an article to its corresponding release mechanism. Furthermore in many cases each release mechanism requires a considerable amount of power to effectively release an article from its storage means.

The above mentioned defects are overcome by an article dispensing system according to the invention having means for independently supporting a variety of articles for delivery, these supporting means being so allocated to two sets of groups that each supporting means appears in one and only one group of each set. Release mechanisms are associated with each supporting means and electromagnetic means are provided in each group of supporting means in one of the sets to influence all the release mechanisms in this group. Additional electromagnetic means in each group of supporting means in the other set are adapted to influence all the release mechanisms in the other group. Electrical selecting means enable the selective actuation of the electromagnetic means of one group in said one set and the electromagnetic means of one group in said other set to effectively actuate the release mechanism of the supporting means common to the two last mentioned groups.

According to another feature of the invention the article dispensing system is provided with compartments arranged in horizontal and vertical rows for the storage of a variety of articles. A release mechanism including an operating lever is associated with each compartment. To actuate a selected release mechanism a horizontal bar is provided for each horizontal row of compartments and a vertical bar for each vertical row of compartments, these vertical bars carrying the abovementioned operating levers, which are pivoted thereto. The horizontal bars can be selectively operated to form a fulcrum for all the levers of the release mechanisms of the corresponding horizontal row, and any of the vertical bars can then be actuated to move all the levers of the corresponding vertical row, but turn only the lever for which a fulcrum has been provided by an operated horizontal bar. This lastmentioned lever then ejects an article from the corresponding compartment.

It is still a further feature of the invention to provide electrical contacts operated by a selected operating lever to transmit an indication characteristic of a selected article to an indicating device.

It is another feature of the invention to transmit indications characteristic of a selected article to an indicating device by the joint operation of contact sets actuated by the means operating the horizontal bars and by the vertical bars respectively. According to a further feature of the invention articles of various character are stored in inclined chutes which are exchangeable and have adjustable front parts to adapt each chute to articles of different shape.

According to another feature of the invention articles of various character are carried by movable members, driven by pulleys each forming one part of a clutch device. The movable members are arranged in horizontal and vertical rows and a horizontal driving shaft is provided for each horizontal row of movable members and a vertical bar for each vertical row of movable members. The system comprises means for selectively driving one of the horizontal shafts from a common driving source to drive the other part of the clutch devices and further means to selectively operate one of the vertical bars to actuate said other part of the clutch devices of the corresponding vertical row of movable members to effectively move the pulley of the movable member, whose pulley is driven by the selected horizontal shaft, and to release articles from said movable member.

Figure 2:
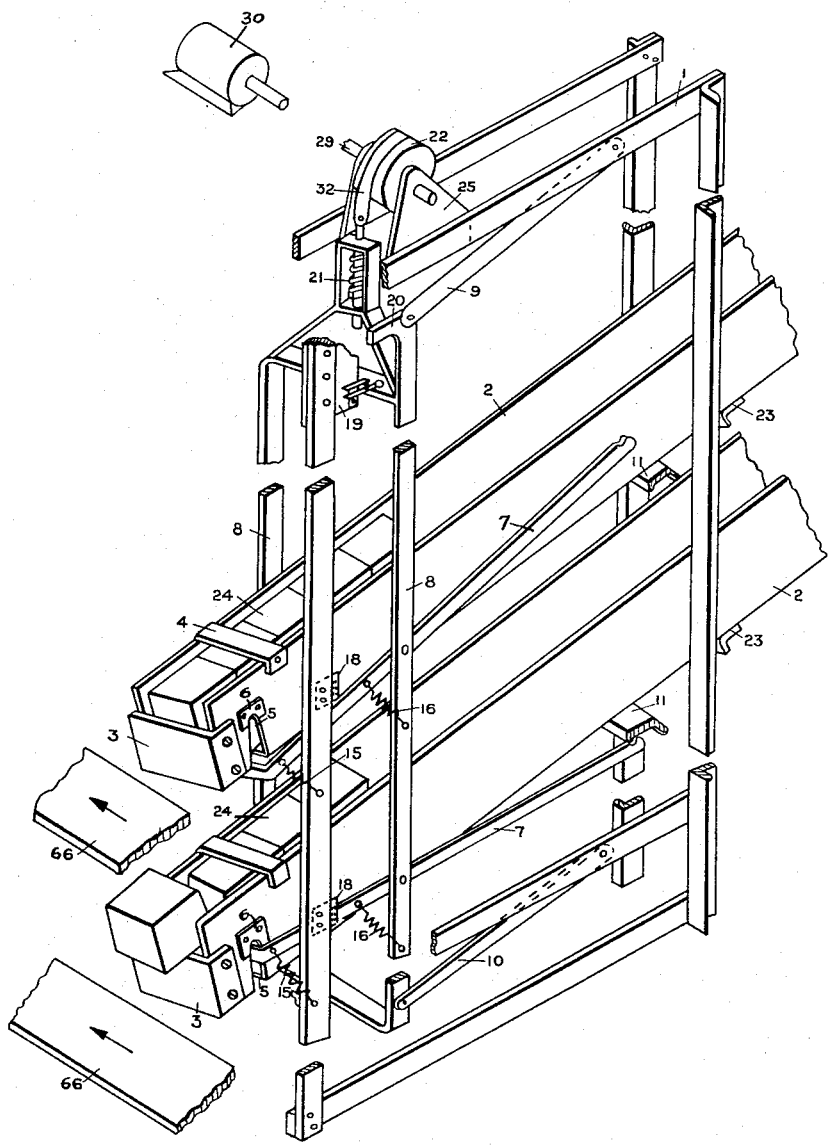
Figure 3:
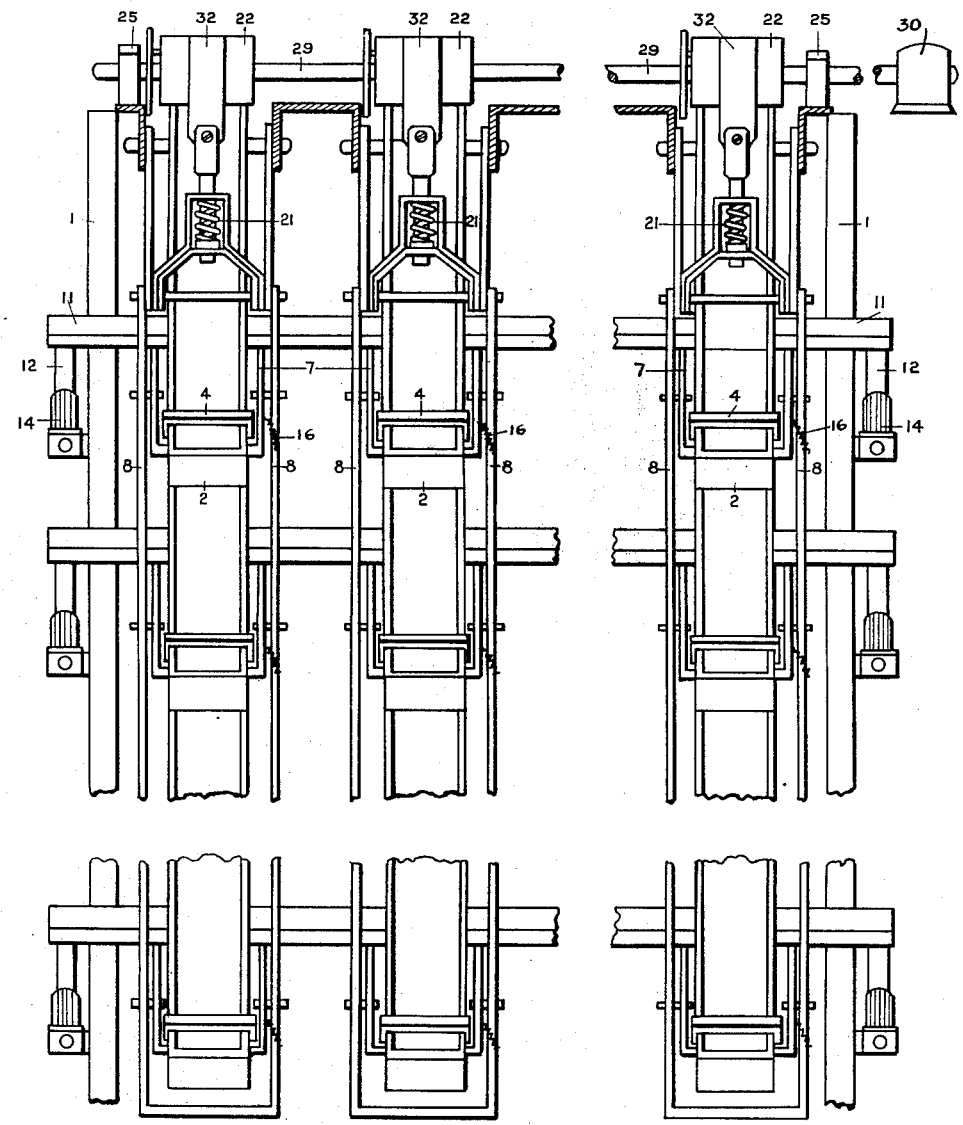
Figure 4:
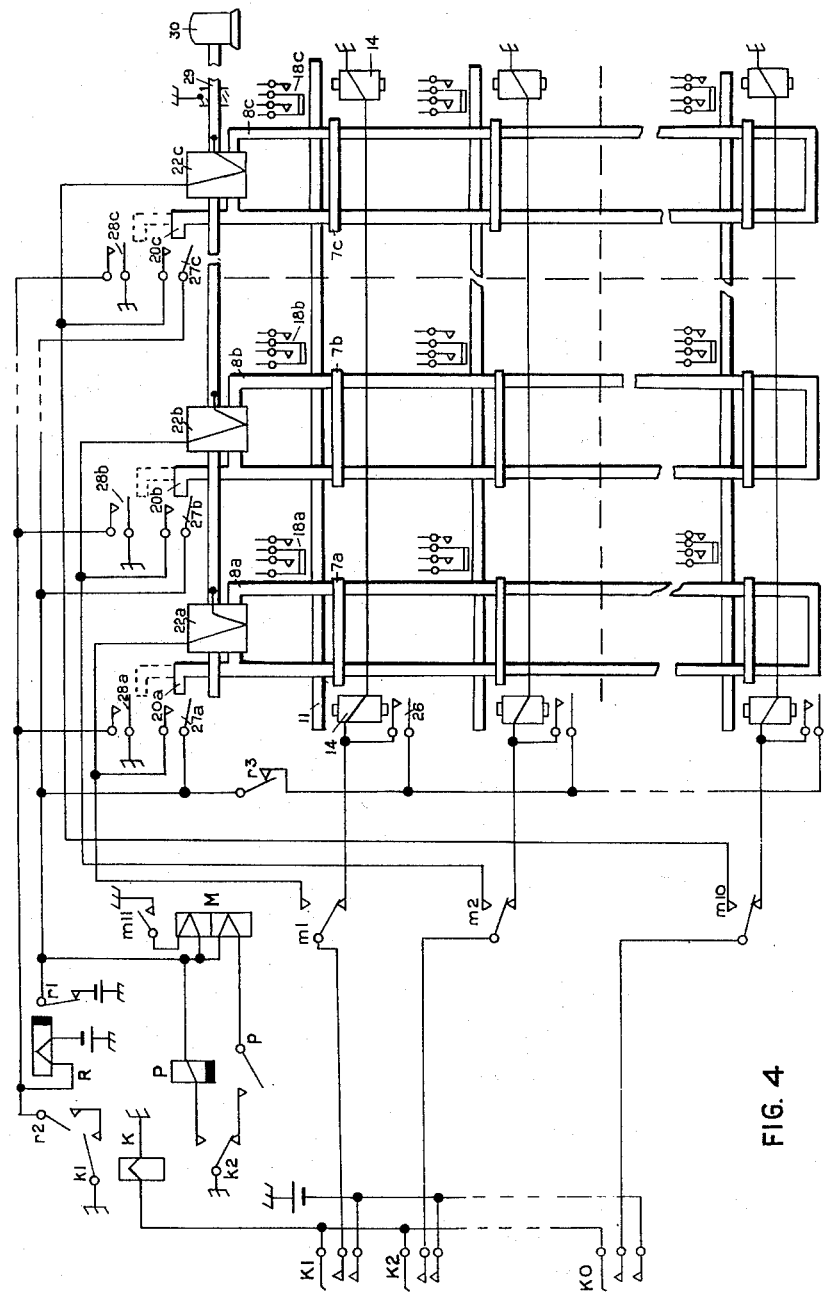
Figure 5:
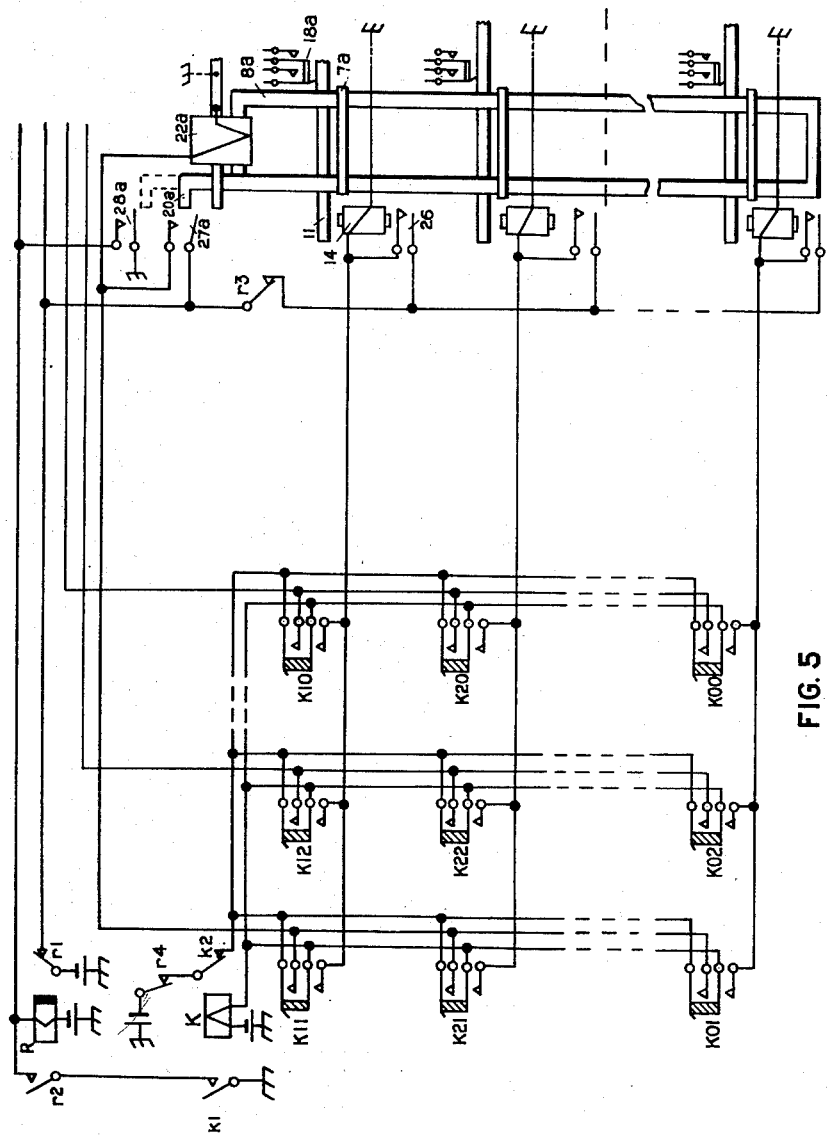
Figure 6:
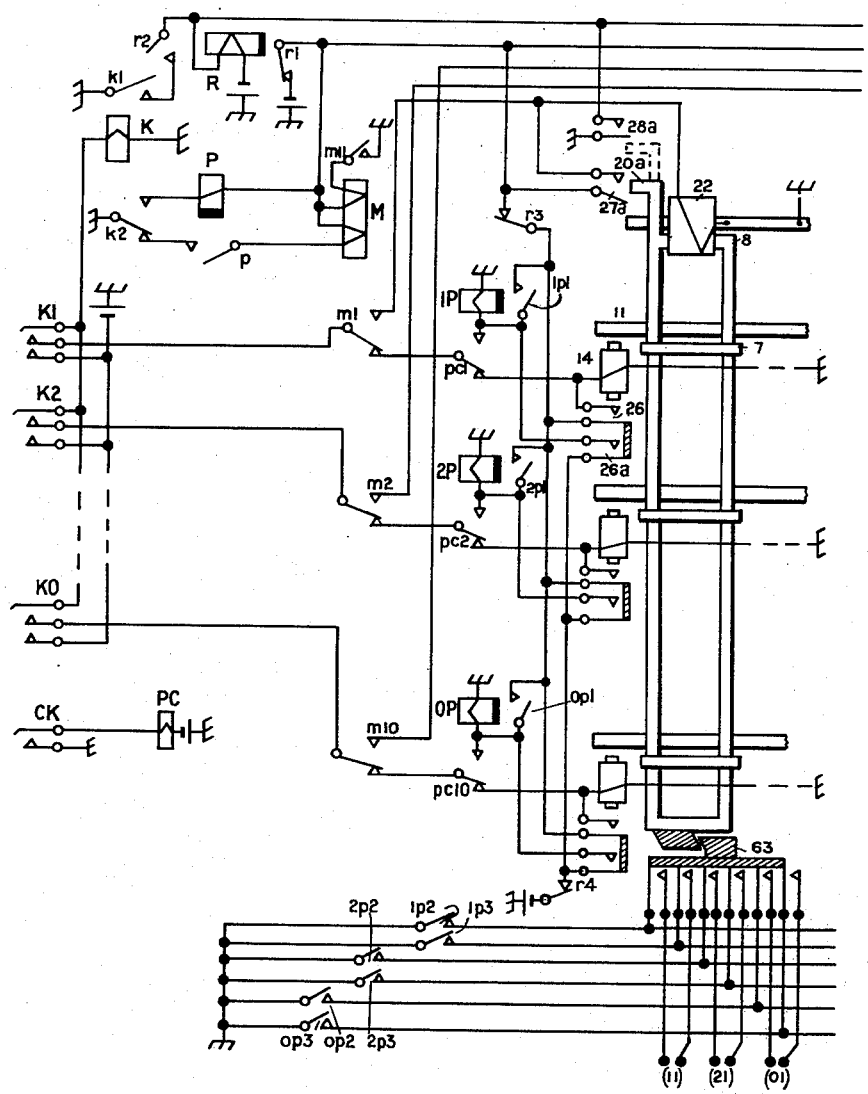
Figure 8B:
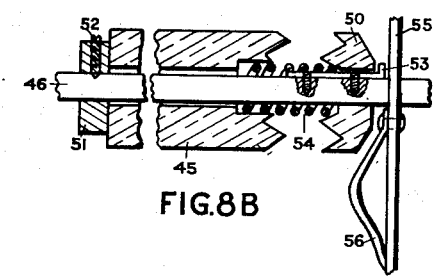
Figure 8A:
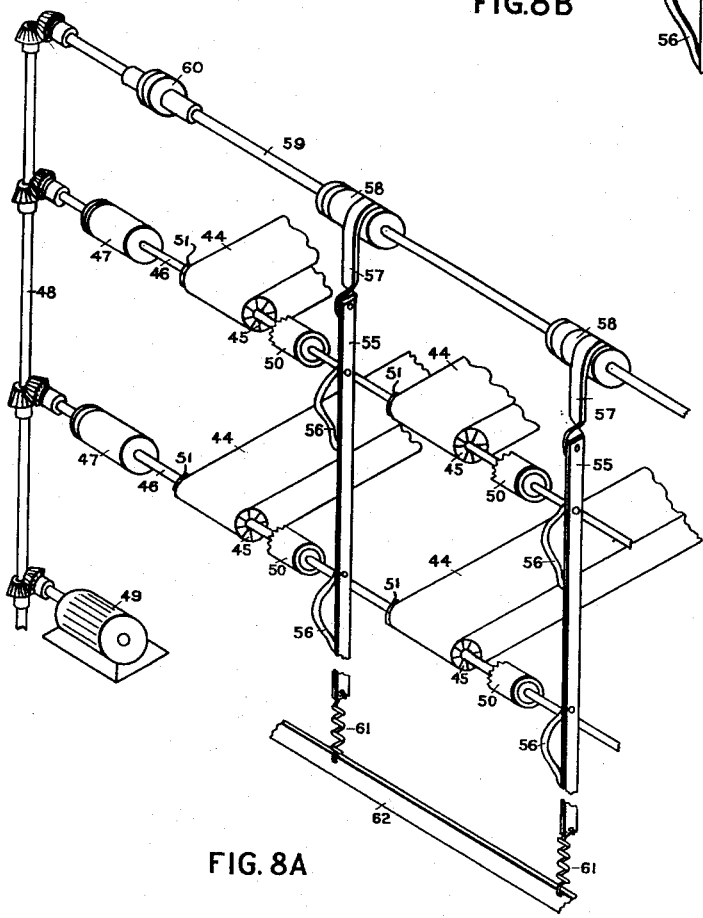

These and other features of the invention will be more clearly understood from the following description in connection with the drawings in which Figure 1 shows the release mechanism for one storage compartment according to one embodiment of the invention, Figure 2 shows the same release mechanism in operation, Figure 3 shows a front view of the storage compartments, Figure 4 shows a circuit diagram for an article dispensing system, in which the articles are selected by a code, Figure 5 shows a circuit diagram in which the articles are selected by individual keys, Figure 6 shows a variation of the circuit diagram of Figure 4 to enable price checking in an article dispensing system, Figures 7A, 7B and 7C show part of a compartment with bin empty and trip contact and a modified discharge arrangement, Figures 8A and 8B show another embodiment of the invention using belts for the storage of articles.

In the construction shown in Figures 1 and 2 the articles to be dispensed are stored in chutes arranged in horizontal rows and vertical rows or columns upon a framework. The framework 1 shown is only part of the structure, which extends to carry the chutes extending in accordance with the amount of articles they have to store. The chutes 2 may be secured to the framework but preferably are arranged upon it in readily removable manner so that each chute can be taken out for reloading or readjustment purposes. As shown the chutes rest on brackets 31 attached to the framework 1 and are held in position by stops 23 resting against these brackets. In each chute articles of a single kind are stored in single file as indicated at 24 (Figure 2). It will be apparent to those skilled in the art that the articles may be fed forward in the chutes by other known devices, but preferably as shown the chutes are inclined sufficiently for the articles to move downward under gravity when not restrained. The latter arrangement facilitates furthermore the discharging of articles as will be described later on.

Each chute is closed at its front or lower end by an adjustable stop member 3, which preferably is lower in height than the articles abutting upon it. An adjustable strap 4 is secured across the top of the chute above the second article in the file to prevent it rising while the foremost article is ejected as described later on.

In the bottom and sides of each chute near its end is a slot 5 the vertical depth of which may be adjusted by securing a plate 6 across the upper end of the slot. The slot 5 permits the entry into the chute of the end of a U-shaped operating lever or ejector 7, and the top of the slot 5 or the plate 6 limits the rise of the operating lever to what is necessary to eject an article 24 over the stop member 3. To this end it is necessary to adjust the stop member 3 in such a way that the foremost article 24 extends across or covers the slot 5.

All the operating levers 7 of one vertical row or column of chutes are pivoted upon a common vertical bar 8. If the levers 7 are of U-shape bars 8 may be arranged on both sides of each column of chutes as shown in Figure 2, each operating lever 7 being pivoted at both bars 8. Each bar 8 or pair of bars is suspended by a metal strip 32 from a drum 22 mounted loosely upon a transverse shaft 29, which extends across all the columns of chutes through bearings 25 and is constantly driven by a motor 30 (Fig. 2). A spring 21 is interposed between the strip 32 and the bars 8 to allow for travel adjustments of the levers 7 in accordance with the plates 6 at the chutes 2. In a preferred form the drum 22 forms part of an electromagnetic clutch which upon selection connects the drum 22 with the rotating shaft 29, to provide power for lifting the bars 8 with the operating levers 7. Such an electromagnetic clutch is, for example, described in United States Patent 2,523,772 by R. H. McGibbon et al. The bars 8 are constrained to remain during movement parallel to their initial position by radius arms 9, 10 pivoted to them and to the framework 1.

In order that an operating lever 7 should become operative to lift an article from a chute it is necessary to provide the lever 7 with a fulcrum about which it may turn when the bar or pair of bars 8 are moved vertically. Without a fulcrum the vertical movement of bar 8 merely tilts to operating lever 7 idly as indicated by the upper lever 7 in Figure 2, its front end being held down by spring 15 connecting the lever 7 with the framework 1, so that the end of the lever rests against a stop member 17 at the framework and is held clear of the corresponding chute. A second spring 16 connecting the operating lever 7 with bar 8 assists in keeping the lever in the indicated position, as spring 15 has to be rather light not to obstruct the movement of lever 7 for the ejection of an article as described later.

Fulcra are provided for a whole horizontal row of operating levers 7 by a common fulcrum bar 11 supported at its ends upon leaf springs 12 secured to brackets 13 on the rear part of framework 1. These brackets 13 carry electromagnets 14 the armatures of which are secured to the leaf springs 12. Excitation of these magnets 14 causes the bar 11 to be moved forward so that its front bent edge engages over the hook-shaped rear ends of a row of operating levers 7 in the manner shown in Figure 2 for the lower operating lever 7.

When the rear end of a row of operating levers 7 is thus fulcrumed, lifting of a bar 8 will cause the front end of the operating lever, pivoted at said bar 8 and obstructed by the bar 11, to enter the slot 5 of the corresponding chute and eject an article 24 over the stop member 3 onto a transverse collector belt 66, which carries the article to the desired point of delivery.

The strap 4 prevents the second article from being lifted at the same time; as soon as the first article is ejected from the chute, the second moves down so far as permitted by the lever 7 and when the lever 7 falls down again, this article moves up against stop member 3 thus covering slot 5.

For the purpose of signalling the delivery of an article, for instance by the exhibition of its price upon a price indicator, each operating lever 7 may be caused to operate electrical contacts 18 arranged upon the framework 1. The purpose of these contacts will be explained in more detail later on.

Direct indication of discharge of an article may be given by contacts arranged over each chute as shown in Figures 6, 7A and 7B. Figures 7A and 7B show a modification of the ejection arrangement at the front part of chute 2. Chute 2 carries a strap 4 as mentioned before and on this strap is mounted a contact set 33 which is operated each time an article is ejected from the chute. In addition each chute may be provided with contacts normally held open by the articles in the chute and operating when the stock is exhausted to give a "bin empty" signal. As shown in Figures 7A and 7B a plate 34 is mounted on studs 35 passing through the stop member 3. One of the studs engages a contact set 36 suitably fixed to a bar 37 forming part of the framework. When articles are loaded in the chute 2 these articles press the plate 34 against springs 38 on to the contact set 36 thus keeping the contacts closed. When no articles are stored in the chute these contacts remain permanently open thus indicating that the chute is empty. As the contact set would operate momentarily each time an article is ejected it can be used also to prevent a second operation of operating lever 7 until the second article has taken the place of the article ejected before.

To give the article a slightly forward movement, while it is ejected from the chute 2 by operating lever 7 an ejection plate 39 can be movably fixed in the end of chute 2 over the lower part of slot 5 as shown in Figure 7A. The plate 39 is hinged by a pivot 40 in suitable brackets 43 formed at the stop member 3 and is welded or otherwise fixed to a spring bracket 41. The inner end of bracket 41 carries a pin 42 fitting under spring tension into a corresponding hole of lever 7 which is slightly larger in diameter than pin 42 to allow for a relative movement between the pin and lever 7. When lever 7 is lifted, the plate 39 is moving around pivot 40 thus giving an article resting thereon an upward and forward movement which safely ejects the article from the chute. In this case lever 7 moves only slightly into slot 5 as the free end of ejector plate 39 travels a longer distance than lever 7 to give the necessary impetus to the article. The ejector plate 39 is easily exchangeable, so that plates of different length can be used for articles of various size. To facilitate the exchange the pivot 40 of plate 39 has flatted ends as shown in Figure 7C. The brackets 43 at stop member 3 (Figure 7A) are slotted at the upper side to let the small side of the flatted ends of pivot 40 pass. To exchange the plate 39, the bracket 41 with pin 42 is withdrawn from the hole in lever 7 and the plate 39 is raised to a vertical position. In this position the plate with pivot 40 can be withdrawn through the slots in the brackets 43 and another plate inserted in the same way.

Returning to Figures 1 and 2 it will be understood that ejection of any selected article by the mechanism may be brought about by first exciting the magnets 14 of one fulcrum bar 11 and then exciting the magnetic clutch of one drum 22. The consequence is that one horizontal row of operating levers 7 is provided with a fulcrum and one column or vertical row of operating levers 7 is lifted by their common bar 8; thus only the operating lever common to both the horizontal and vertical row is effective to lift an article.

The bar 8 or a pair of bars 8 has a projection or nose 20 at its upper part which when the bar is moved operates contacts 27 and 28 fixed by a support 19 to the framework 1. These contacts perform the necessary switching operations to release the clutch of drum 22 and the magnets 14 as will be described later on in connection with Figure 4.

The arrangement of the chutes in horizontal and vertical rows or columns is shown schematically in Figure 3. Three columns and three horizontal rows only are shown but it must be understood that rows and columns can be extended without departing from the scope of the invention. As shown in Figure 3 the common shaft 29 secured in bearings 25 carries the drums 22 which are loosely mounted on the shaft and include magnetic clutches which enable each drum to be individually connected with the shaft.

As described above each drum 22 is connected by a metal strip 32 and a spring 21 with a pair of vertical bars 8, which pass along both sides of a vertical row or column of chutes 2. Each chute 2 with strip 4 carries articles of one kind. Underneath each chute passes a corresponding operating lever 7 hinged to the pair of bars 8. A fulcrum bar 11 runs horizontally along one row of chutes 2 and is fixed on both ends at leaf springs 12. Each fulcrum bar 11 is operated as described above by magnets 14 fixed to the framework 1.

Another embodiment of the invention incorporating the same principle of selection is shown schematically in Figures 8A and 8B. In Figures 8A the articles to be dispensed are stored on horizontal belts 44 which are normally stationary and are selectively movable to discharge articles therefrom. Details of such an article dispensing system are for example described in U. S. Patent 2,627,941 by T. S. Skillman. In this system each belt is driven from common driving means over an electromagnetic clutch operable via a selecting relay group. To reduce the number of relays and to replace the electromagnetic clutches by simple coupling devices the selection of a belt is carried out according to the invention by combined horizontal and vertical selection. In Figure 8A each belt can be driven by a pulley 45 forming part of a dog-clutch. All pulleys 45 of one horizontal row of belts are rotatably mounted on shafts 46 which can be connected by clutches 47 with a common driving shaft 48 driven continuously from driving means 49. The other part 50 of each dog-clutch is slidably mounted on shaft 46 and rotates therewith. Details of this clutch are shown in Figure 8B. Rotatably mounted on shaft 46 is the pulley 45 which is used to move a belt as shown in Fig. 8A by pulley 45 and belt 44. One side of pulley 45 rests against a collar 51 fixed to shaft 46 by a grub screw 52. The other side of pulley 45 is equipped with teeth which fit into the grooves between corresponding teeth in the other part 50 of the clutch. This part is mounted on shaft 46 by a key 53 so that it is turned together with the shaft and can slide in the direction of the shaft. The both parts 45 and 50 of the clutch are normally held apart by a spring 54 encircling the shaft. To engage the clutch a bar 55 is moved upwards. This bar carries a leaf spring 56 which upon upward movement of bar 55 presses the part 50 against the tension of spring 54 into engagement with pulley 45, so that the pulley is driven by shaft 46.

As can be seen from Figure 8A one bar 55 is provided for each vertical row or column of storage belts 44 to operate all the dog-clutches of this column. The bar 55 is connected at its upper end by a metal strip 57 with a suitable clutch 58. All clutches 58 are driven from the common driving shaft 48 by a shaft 59 and selectively connectable therewith. A friction clutch 60 can be inserted in the drive from shaft 48 to shaft 59 to take up any torsion which might arise from the operation of clutches 58 and their respective bars 55. The lower ends of the bars 55 are connected by spring 61 to the framework 62 to return the bars 55 into their initial position after the release of the corresponding clutch 58.

To operate one of the storage belts 44 for the release of an article the clutch 47 of the horizontal row of belts including the wanted belt is operated, for example, electromagnetically and thus the corresponding shaft 46 rotates. Then the clutch 58 of the vertical row or column including the wanted belt is operated and thus the corresponding bar 55 is raised under the force transmitted through shaft 59. The bar 55 thus brings all dog-clutches of this column into engagement but as only one horizontal shaft 46 is rotating only one dog-clutch operates to drive its belt for the release of an article. The bars 55 can be used to operate electrical contacts in the same manner as the bars 8 in Fig. 1.

Various circuits for the operation of the electromagnetic clutches shown in Figures 1, 2 and 8A and the magnets in Figures 1 and 2 will be described hereafter.

Figure 4 shows the electrical circuits for an article dispensing system using 100 chutes carrying the various articles. These chutes are arranged in 10 vertical and 10 horizontal rows and in Figure 4 are indicated by a set of horizontal bars 11, a set of vertical bars 8 (8a, 8b, 8c) and the various operating levers (7a, 7b, 7c). The various parts in the first vertical row have the same designations as the parts in Figures 1 and 2 with the additional suffix a. The second vertical row of 10 chutes is indicated by the suffix b and the tenth vertical row of chutes is indicated by the suffix c.

In the example shown each article carries a two digit designation which can be keyed up on a keyboard comprising ten keys K1, K2 up to K0. The selection is performed with the additional relays K, P, M and R. Relay K is operated each time a key is pressed and prepares in combination with relay P the switching over from the horizontal row to the vertical row or column of chutes as will be seen later. The switching itself is carried out by relay M and all circuits are released after their operation by relay R depending on relay K to ensure that no second article can be dispensed when the key is pressed too long. The first operation of one of the keys operates one of the horizontal bars 11 which run across each horizontal row of ten chutes while the second operation of one of the keys operates a corresponding vertical bar 8 running down a vertical row or column of 10 chutes.

It may be assumed that an article with a designation "12" shall be selected. The operator first presses the key K1 corresponding to the first digit of the article designation and thus closes a circuit from battery via key K1, relay K to earth and a second circuit from battery via key K1, contact m1, the two magnets 14 at both ends of the horizontal bar 11 in series, to earth. Relay K prepares at its contact k1 a circuit for the release relay R which is still interrupted at contact r2 and its contact k2 closes a circuit for the relay P which operates over contact r1 closing its contact p.

The magnets 14 shift the horizontal bar 11 of the first horizontal row of chutes in the paths of their respective operating levers 7a, 7b to 7c. At the same time a holding circuit for the magnets 14 is closed by one of the magnets over the contact 26 from battery over contacts r1 and r3, contact 26, the magnets 14 in series, to earth. Thus these magnets remain operated when key K1 is released again.

As soon as key K1 is released the K relay is deenergized and thus closes over the back contact k2 a circuit for the relay M while the contact p is still operated. relay P being a slow-release relay. Relay M closes over its own contact m11 a holding circuit via its second winding and contact r1 to battery so that it remains operated when relay P releases and opens its contact p. The relay M changes over its contacts m1, m2, to m10 and thus connects the leads of the ten keys with the clutches 22a, 22b up to 22c which operate the ten vertical bars 8a, 8b up to 8c.

The second digit of the article designation is now keyed up by operating the key K2. Thus a circuit is closed from battery via key K2, relay K to earth and further from battery via key K2, contact m2, clutch 22b, shaft 29 of the common power drive 30, to earth. Clutch 22b is now operated lifting up the vertical bar 8b. As the bar 11 of the first horizontal row was shifted by the magnets 14 the operating lever 7b will be obstructed at its end as described above in connection with Figure 2 and thus the movement of bar 8b will operate this lever in such a way that an article will be ejected from the corresponding chute. At the same time lever 7b operates the contact set 18b which thus gives a price indication or any other kind of indication about the released article. The contact springs of contact set 18b can, for example, be connected with corresponding bars of a pricing frame similar to the cross bar arrangement described in United States Patent No. 1,773,421 by J. W. Bryce.

As soon as the bar 8b starts its upwards movement the nose 20b permits the contact 27b to close and thus to establish a holding circuit for the magnet 22b over contact r1 and battery to earth. The energization of the clutch is now independent of the further operation of release of key K2.

When the nose 20b of the operated lever 8b reaches its upper position and the key K2 had been released in the meantime, a circuit is closed from earth via the contact 28b operated by nose 20b, slow-release relay R to battery. Relay R opens its contact r1 and thus interrupts the holding circuits for relay M, the magnets 14 and the clutch 22b so that they release, contact 28b opens again releasing relay R and thus the whole circuit arrangement is restored back to normal. As clutch 22b is released immediately when bar 8b has reached its highest position, no strain is put on the drive and furthermore the spring between the clutch and the bar takes up any shocks which might occur.

If the key K2 was still pressed and relay K operated when the nose 20b closes the contact 28b the release relay R operates and closes a holding circuit over contact k1 and its own contact r2. At contact r3 the holding circuit for the magnets 14 is interrupted. Although in this case the magnets 14 operate again, they are released immediately when the key K2 is released again. Relay P cannot operate as contact r1 is opened. This provision is made to prohibit any false operation which would occur when a key is still pressed while the circuit has been released by relay R. At the release of key K2 relay R releases as well and the circuit is restored to normal.

Although in the example shown the selecting and release mechanisms are operated by a circuit arrangement using ten keys for the selection of 100 various kinds of articles, other selecting circuits can be used and for example the same selecting and release mechanisms can be operated by a keying arrangement in which a separate key is provided for each kind of article. Such an arrangement is shown in Figure 5.

In this latter case each key has two contact sets, one directly connected with the magnets 14 of the horizontal row of compartments containing the article related to this key, the other contact set being directly connected with the clutch or solenoid 22a of the vertical row of compartments containing this article, thus eliminating the changeover relay M.

Provision is made to ensure that while selecting an article, the horizontal bar associated with this article is operated before the corresponding vertical bar is raised and this is done either by an off-normal contact at each horizontal bar, which contact is included in the common lead of the clutches or solenoids 22, or by a quick operating relay in the common circuit of the vertical bars as described below. The selecting and release mechanisms themselves remain the same as those in Figure 4 and thus only one column is shown in Figure 5.

If, for example, an article with the number 11 has to be selected K11 is pressed and closes a circuit from battery over the fast operating relay K, key K11, magnet 14 to earth. Although at the same time a circuit is closed from battery over contact r4, contact k2, key K11, clutch 22a to earth, the clutch cannot operate as it is slower in operation than relay K and this circuit is immediately interrupted again by contact k2.

When magnet 14 has operated and shifted bar 11 it closes its contact 26 thus establishing a holding circuit for magnet 14 over contacts r3 and r1 to battery, and at the same time short-circuits relay K which releases, closing again the circuit for clutch 22a at contact k2. At the movement of bar 8a contact 27a is closed establishing a holding circuit for clutch 22a over contact r1 to battery. When the projection 20a of bar 8a closes the upper contact 28a slow release relay R is operated removing battery from the holding circuits of clutch 22a and magnet 14 to return the whole arrangement to normal. In case key K11 was still pressed at the operation of relay R, relay K operates again at the release of magnet 14. Relay K closes at contact k1 a holding circuit for relay R over contact r2. At contact r3 the holding circuit for magnet 14 is further interrupted and at contact r4 battery is removed from the connection to clutch 22a so that no further article can be dispensed until key K11 is released again.

In Figure 4 contacts 18a, 18b . . . 18c are operated by the various operating levers 7a, 7b . . . 7c to give a price indication on a suitable price indicator via a pricing frame. In some cases it is necessary to provide facilities to check the prices of articles by keying up the code of an article without releasing the article itself. As in the arrangement of Figure 4 the contacts 18a . . . are always operated together with the operating lever, a price indication cannot be given without the release of an article.

A modification of the arrangement of Figure 4 which enables price checking is described hereafter in connection with Figure 6. The arrangement of the chutes, bars, magnets and clutches is the same as shown in Figure 4. Instead of the contacts operated by each lever 7, each magnet 14 has two contact sets 26 and 26a and each vertical bar 8 operates a contact group 63 of twenty contacts, six contacts only being shown in the drawing. The normal operation for the release of an article is the same as described before except that the operating circuits for the magnets 14 pass over contacts pc1, pc2 . . . . pc10 of the price checking relay PC. All parts which are identical in Figure 4 and Figure 6 are marked with the same references so that no detailed description of the functions of these parts is necessary. To mark a price of a article on a pricing frame as, for example, shown in the abovementioned U. S. Patent No. 1,773,421 by J. W. Bryce, contact 26a of the operated magnet 14 is closed and thus closes a circuit for the corresponding pricing relay, for example relay 1P from battery over contact r4, contact 26a, relay 1P to earth. Relay 1P establishes a holding circuit from battery over contact r1, contact r3, its own contact 1p1, relay 1P to earth. Over contacts 1p2 and 1p3 earth is connected with the corresponding two contacts in the contact groups 63 operable by the vertical bars 8. When one of the vertical bars 8 is lifted by its clutch 22 it closes its contact group 63 and those contacts connected to earth by the prior operation of one of the relays 1P, 2P . . . 0P then extend the earth connection over leads (11), (21) . . . (01) for the first bar 8a or corresponding leads from the contact groups of other vertical bars to the corresponding bars of a pricing frame to mark the price of an article selected by the operation of a horizontal bar 11 and a vertical bar 8.

When price checking is required the relays 1P, 2P . . . 0P respectively and the contact groups 63 of the appropriate vertical bar 8 have to be operated without the release of an article. Before operating the selection keys the checking switch CK is thrown and energizes relay PC. Over the contacts pc1 to pc10 the leads from the keys K1 to K0 are now disconnected from the corresponding magnets 14 and connected with the relays 1P, 2P . . . 0P. Operation of one of the keys thus energizes the corresponding relay which locks itself over its own contact as described above, but without operation of any of the magnets 14. The next operation of one of the keys energizes in the manner already described one of the clutches 22 which operates the contact group 63 for the marking of the price. No article however is discharged in this case as all bars 11 are in the unoperated position and thus the levers 7 are lifted at their rear ends, as shown for the upper chute in Figure 2. The release of the checking switch CK deenergizes relay PC and thus returns the circuits back to their normal state for the selection and discharge of articles.

The foregoing description shows the invention by way of examples only and further modifications can be made without departing from the spirit of the invention. Instead of selecting the articles directly from a keyboard, the code of wanted articles can be sent into a code-storing register which then in turn operates the release mechanisms described above as for example described in U. S. Patent 2,627,941 by T. S. Skillman. The price indicator or an indicator for other values instead of being operated by contacts of the release mechanisms can be operated by the register or any other part of the selecting circuits.

I claim:

1. A system for dispensing articles of various character having compartments for the storage of a variety of articles, said compartments being arranged in horizontal and vertical rows; a release mechanism associated with each compartment, each release mechanism including an operating lever to eject articles from said compartment; a horizontal bar for each horizontal row of compartments movably suspended adjacent to and slightly above the ends of the operating levers of the corresponding row, and electromagnetic means selectively operable to move one of said horizontal bars into the paths of said operating levers to form a fulcrum for the operating levers of the corresponding horizontal row of release mechanisms; a vertical bar for each vertical row of compartments, said vertical bars carrying said operating levers pivoted thereto and actuated thereby; and further electromagnetic means selectively operable to actuate one of said vertical bars carrying the levers of the corresponding vertical row of release mechanisms, only one of said levers turning about its fulcrum formed by said operated horizontal bar to eject an article.

2. A system for dispensing articles as claimed in claim 1 in which a contact device is associated with each compartment and arranged in the path of said operating lever and operated thereby for the transmission of signals related to the articles selected and discharged from said compartment.

3. A system for dispensing articles as claimed in claim 1 in which each compartment consists of a chute exchangeably mounted in a frame work under an angle to the horizontal plane, a slot in the lower part of said chute and an adjustable stop member at the lower end of said chute, said stop member being so adjusted that the last article carried in said chute covers said slot; an adjustable plate at said chute to alter the length of said slot; the operating lever associated with said chute having one arm stretching underneath said chute opposite said slot and upon turning of said lever about its fulcrum entering said slot and ejecting an article from said chute.

4. A system for dispensing articles as claimed in claim 1 in which each compartment consists of a chute, a slot in the lower part of said chute; a stop member at the lower end of said chute; an ejection plate fixed on a pivot at the lower end of said chute and covering said slot; the operating lever associated with said chute having one arm stretching underneath said chute opposite said slot and being flexibly linked with said ejection plate, said arm upon turning of said lever about its fulcrum entering said slot and lifting said ejection plate around said pivot for the ejection of an article from said chute.

5. A system for dispensing articles as claimed in claim 1 in which each compartment consists of a chute exchangeably mounted in a frame work under an angle to the horizontal plane; a slot in the lower part of said chute; an adjustable stop member at the lower end of said chute and a first contact device fixed thereto, said contact device having an operating member protruding into said chute and being operable by the foremost of the articles stored in said chute; a strap adjustably mounted across said chute at a point above the second of said articles and a second contact device fixed to said strap having an operating member protruding into the ejection path of said foremost article and operable by said article; the operating lever associated with said chute having one arm stretching underneath said chute opposite said slot and upon turning of said lever about its fulcrum entering said slot and ejecting said foremost article from said chute.

6. A system for dispensing articles of various character having compartments for the storage of a variety of articles, said compartments being arranged in horizontal and vertical rows; a release mechanism associated with each compartment; a horizontal bar for each horizontal row of compartments and a vertical bar for each vertical row of compartments; means to selectively operate one of the horizontal bars for preconditioning the release mechanisms of one horizontal row of compartments, said means including a contact set operated thereby; a relay electrically connected with each contact set and operated thereby; further means to selectively operate one of the vertical bars for actuating the release mechanisms of one vertical row of compartments and to effectively release an article in said vertical row from a compartment whose release mechanism had been preconditioned by said horizontal bar; and a further contact set associated with each vertical bar and operated thereby to close a circuit prepared by one of said relays for the transmission of signals related to the selected articles.

7. A system for dispensing articles of various character having a plurality of means for independently supporting a variety of articles for delivery, said supporting means being arranged in horizontal and vertical rows; a release mechanism associated with each of said supporting means and having an actuated part and an actuating part; first electromagnetic means for each horizontal row of release mechanisms to precondition upon operation all release mechanisms of the corresponding horizontal row for actuation; a power drive common to all said vertical rows; a vertical bar for each of said vertical rows mechanically linked with the actuated parts of all release mechanisms of said row, and second electromagnetic means for each of said vertical rows to selectively connect any of said vertical bars with said power drive to move upon operation the actuated part of each release mechanism in the corresponding vertical row and to operate the actuating part of the release mechanism preconditioned by said first electromagnetic means; electrical selecting means comprising manually operable selection keys and switching means electrically connected therewith to select any of said release mechanisms and to initiate the dispensing of an article from said supporting means, and electrical connections from said selecting keys over said switching means to said first electromagnetic means and to said second electromagnetic means to establish operating circuits therefor, said switching means including contact means interposed in the operating circuits of said second electromagnetic means to operate said second electromagnetic means depending on the operation of said first electromagnetic means; and a contact arrangement associated with and actuated by each of said vertical bars and electrical connections therefrom to said switching means to interrupt said operating circuits and to deenergise said first and said second electromagnetic means.

References Cited in the file of this patent

UNITED STATES PATENTS 1,009,265    Stern et al. _____ Nov. 21, 1911